US009837681B2

(12) United States Patent
Lim et al.

(10) Patent No.: US 9,837,681 B2
(45) Date of Patent: Dec. 5, 2017

(54) LOW CAPACITY, LOW AREA-SPECIFIC RESISTANCE BATTERY CELL FOR ELECTRONIC DEVICES

(71) Applicant: Amazon Technologies, Inc., Seattle, WA (US)

(72) Inventors: James Robert Lim, San Jose, CA (US); Thomas Gang Wang, San Jose, CA (US); David Wang, Santa Clara, CA (US); David Tuzman, Menlo Park, CA (US); Poon-Keong Ang, Cupertino, CA (US); Vidhyananth Ramasamy Venkatasamy, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 178 days.

(21) Appl. No.: 14/740,500

(22) Filed: Jun. 16, 2015

(65) Prior Publication Data

US 2016/0372782 A1    Dec. 22, 2016

(51) Int. Cl.
| | | |
|---|---|---|
| *H01M 10/04* | (2006.01) | |
| *H02J 7/00* | (2006.01) | |
| *G09G 3/20* | (2006.01) | |
| *H01M 10/0525* | (2010.01) | |
| *H01M 10/46* | (2006.01) | |
| *H01M 10/44* | (2006.01) | |

(52) U.S. Cl.
CPC ...... *H01M 10/0436* (2013.01); *G09G 3/2092* (2013.01); *H01M 10/0525* (2013.01); *H01M 10/46* (2013.01); *H02J 7/0054* (2013.01); *G09G 2330/021* (2013.01); *G09G 2330/027* (2013.01); *H01M 10/441* (2013.01); *H01M 2220/30* (2013.01)

(58) Field of Classification Search
CPC ........... H01M 10/0436; H01M 10/052; H01M 10/0525; H01M 10/46; H01M 2220/30; H02J 7/0054

See application file for complete search history.

(56) References Cited

U.S. PATENT DOCUMENTS

| | | |
|---|---|---|
| 6,922,151 B2 | 7/2005 | Kawakami |
| 7,348,101 B2 | 3/2008 | Gozdz et al. |

(Continued)

OTHER PUBLICATIONS

PCT Application No. PCT/US2016/037216. International Search Report and Written Opinion dated Aug. 16, 2016, 15 pages.

(Continued)

*Primary Examiner* — Viet Pham
(74) *Attorney, Agent, or Firm* — K&L Gates LLP (57) ABSTRACT

A small capacity battery for powering electronic devices, such as an e-book reader, is provided. This small capacity battery is designed to produce low area-specific resistance, which maintains usable operating voltages even during periods of high current draw. As a result, a lighter and smaller form-factor battery may provide the same battery capacity as a larger and heavier conventional battery. A user may then be provided with a lightweight and small form-factor electronic device that achieves an extended battery life.

20 Claims, 6 Drawing Sheets

(56) References Cited

U.S. PATENT DOCUMENTS

| | | | |
|---|---|---|---|
| 7,782,018 B2 | 8/2010 | Voigt | |
| 2001/0053484 A1* | 12/2001 | Takeuchi | H01M 4/623 429/231.4 |
| 2002/0061436 A1 | 5/2002 | Inagaki et al. | |
| 2003/0087159 A1* | 5/2003 | Jung | H01M 10/052 429/303 |
| 2003/0157409 A1* | 8/2003 | Huang | H01M 2/1686 429/306 |
| 2006/0093921 A1* | 5/2006 | Scott | A61N 1/378 429/245 |
| 2009/0029255 A1* | 1/2009 | Ohmori | H01M 4/0404 429/231.1 |
| 2010/0291442 A1 | 11/2010 | Wang et al. | |
| 2011/0052981 A1* | 3/2011 | Lopez | C01G 45/1257 429/206 |
| 2011/0143218 A1 | 6/2011 | Issaev et al. | |
| 2012/0007556 A1 | 1/2012 | Matsui et al. | |
| 2012/0202099 A1 | 8/2012 | Perry et al. | |
| 2013/0323607 A1 | 12/2013 | Issaev et al. | |
| 2014/0050972 A1 | 2/2014 | Amiruddin et al. | |
| 2014/0203757 A1* | 7/2014 | Ibragimova | H02J 7/0054 320/103 |
| 2014/0217984 A1 | 8/2014 | Banerjee et al. | |

OTHER PUBLICATIONS

Author Unknown, "Thinergy MEC 220 Solid-State Flexible, Rechargeable Thin-Film Micro-Energy Cell," Available at: https://people.ece.cornell.edu/land/courses/ece4760/FinalProjects/s2012/ads264_mws228/Final Report/Final Report/ThinergyMEC220.pdf, (Sep. 20, 2011).

Lu et al., "Electrochemical performance of $Li_{4/3}Ti_{5/3}O_4 Li_{1+x}(Ni_{1/3}Mn_{1/3})_{1-x}O_2$ cell for high power applications," Journal of Power Sources, Elsevier SA, CH, vol. 167, No. 1, pp. 212-216, (2007).

Schweiger et al., "Comparison of Several Methods for Determining the Internal Resistance of Lithium Ion Cells," Sensors, 10, pp. 5604-5625 (2010).

Kadirvel, "Fundamentals of battery fuel-gauging," Texas Instruments, 5 pages, (Nov. 16, 2012).

Krafthoefer, "Measure Battery Capacity Precisely in Medical Design," Power Electronics Technology, 6 pages, (Jan. 2005).

Vega et al., "Selecting an Impedance Track™ Gas Gauge for Li-Ion Single Cell Applications," Texas Instruments, SLUA638, 8 pages, (May 2013).

Yu et al., "Select the right battery fuel-gauge for smart phones and tablets," EDN Network, Available at: http://edn.com/design/power-management/4376050/Select-the-right-battery-fuel-gauge-for-smart-phones-and-tablets, 6 pages, (Jun. 25, 2012).

* cited by examiner

LOW CAPACITY, LOW AREA-SPECIFIC RESISTANCE BATTERY CELL FOR ELECTRONIC DEVICES

BACKGROUND

Portable electronic devices, such as e-book readers, smartphones, or tablet computers, have become increasingly popular. One constraint on usability for portable electronic devices is their limited battery life, due to smaller battery sizes, which requires that users recharge the device after some period of usage. For electronic book ("e-book") readers in particular, it is desirable to provide extended battery life to avoid forcing the user to recharge the e-book reader too frequently. Many users of e-book readers expect to go many days, weeks, or months on a single charge. As a result, increasing the capacity of the battery to improve battery life generally requires an increase in the size and weight of the battery, and, therefore, the device as well. However, reduced weight and thickness are also highly desirable features for portable electronic devices, particularly e-book readers which in typical usage may be held by the user for hours at a time.

In contrast with analog devices, which typically draw a steady current, digital devices place new demands on batteries, including loading the battery with periodic spikes of high current draw. Many of these digital devices are designed with cut-off voltages, such as 3.0V or more, at which point the device stops operating or shuts itself down. As a result, during normal operation, a temporary current spike can cause the device to display a low battery warning to the user and even shut itself down. Although the device could be restarted and operated at a low current draw for an additional period of time, the low battery warning caused by the current spike would cause the user to conclude that the battery is depleted and the device unusable until recharged again.

Accordingly, there is a need for improved battery systems which can minimize device weight and thickness while powering electronic devices, particularly those with high power and peak power demands.

DETAILED DESCRIPTION

In the following description, reference is made to the accompanying drawings which illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

In accordance with aspects of the present invention, a small capacity battery for powering electronic devices, such as an e-book reader, is provided. This small capacity battery is designed to produce low area-specific resistance, which maintains usable operating voltages even during periods of high current draw. As a result, a lighter and smaller form factor battery may provide similar battery performance as a larger and heavier conventional battery. A user may then be provided with a lightweight and small form-factor electronic device that achieves an extended battery life, compared to other small capacity battery form factors.

In accordance some embodiments, the electronic device having the small capacity battery may be part of a modular computing system which includes a supplemental battery module with a larger capacity battery. The supplemental battery module may be attached to the electronic device to recharge the small capacity battery. As a result, the user may choose to use the electronic device alone, when a reduced size and weight is desired, or may choose to use the electronic device coupled to the supplemental battery to provide the user with extended battery life but with an increased size and weight. In accordance with other embodiments, the electronic device having the small capacity battery is a standalone device.

Figure 1:
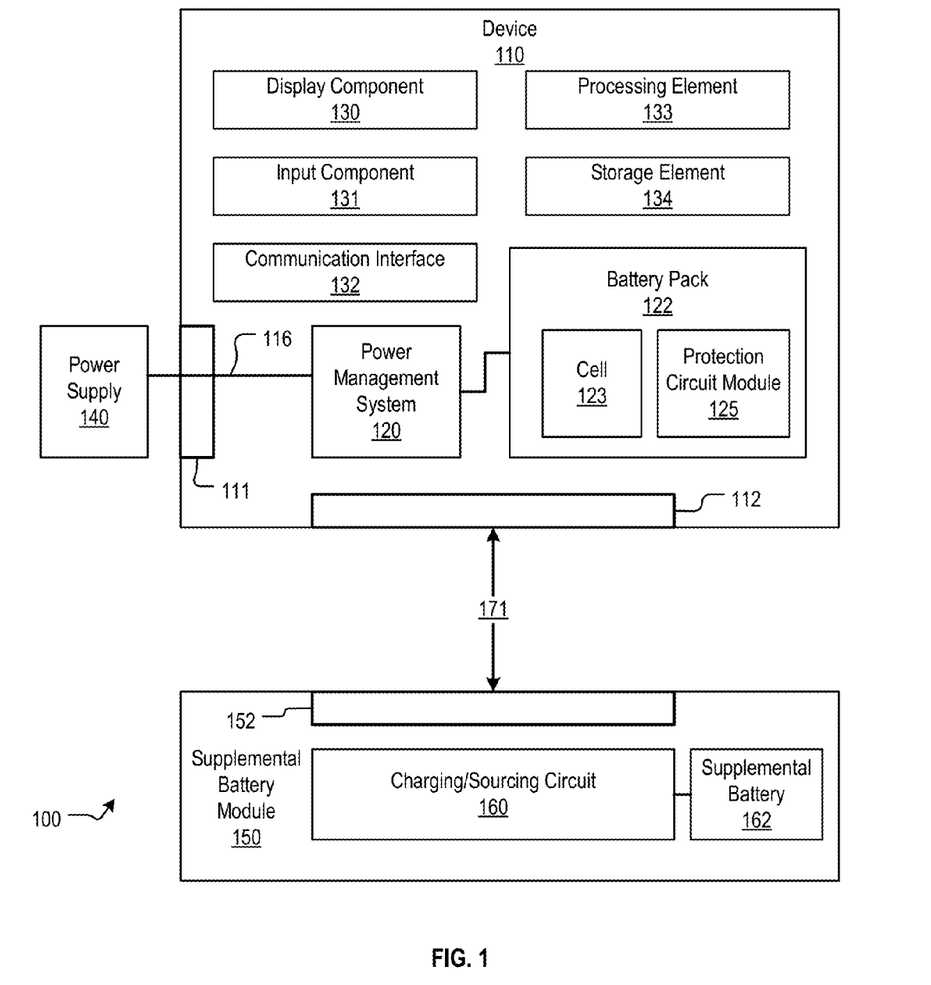
FIG. 1 illustrates a block diagram of a modular recharging system with a supplemental battery module, in accordance with embodiments of the present invention.

FIG. 1 is a block diagram of a modular system 100 comprising an electronic device 110 and a removable supplemental battery module 150, in accordance with embodiments of the present invention. The electronic device 110 is provided with a small capacity internal battery to reduce the size and weight of the device 110, and the supplemental battery 150 is provided with a larger capacity internal supplemental battery to provide extended battery life at the expense of increased size and weight. The electronic device 110 may be implemented as any of a number of battery-powered electronic devices, such as an e-book reader, tablet computing device, smartphone, media player, portable gaming device, portable digital assistant, wearable device, Internet of Things device with embedded electronics and a rechargeable battery, a powered accessory for any of the above-mentioned devices, and other battery-powered devices. Certain embodiments are particularly useful for electronic devices having small capacity batteries which experience variation in current draw during normal use, with periodic spikes caused by various operations on the device.

The electronic device 110 includes an internal device battery pack 122 and a power management system 120 for controlling the recharging of the device battery pack 122. The device battery pack 122 may comprise any type of rechargeable battery suitable for use with the device's intended application, such as, for example nickel metal hydride (NiMH), and, more preferably, to batteries having high energy density chemistries, such as lithium ion (Li-ion)

or lithium ion polymer (Li-ion polymer) batteries. In the illustrated embodiment, the device battery pack 122 comprises a protection circuit module 125 and a small capacity battery comprising a single Li-ion cell 123 having low area-specific resistance, as will be described in greater detail below. In other embodiments, the device battery pack 122 may include a plurality of cells connected in series.

The electronic device 110 may include a display component 130. The display component 130 may comprise, for example, an electrophoretic display (EPD), electrowetting display, electrofluidic display, interferometric modulator display, and/or any other type of bi-stable display. Alternatively, the display component 130 may comprise another type of device capable of rendering visible images, such as, e.g., liquid crystal display (LCD) screens, plasma-based flat panel displays, etc.

The electronic device 110 may include one or more input components 131 operable to receive inputs from a user. The input components 131 can include, for example, a push button, touch pad, touch screen, wheel, joystick, keyboard, mouse, trackball, keypad, accelerometer, light gun, game controller, or any other such device or element whereby a user can provide inputs to the electronic device 110. These input components 131 may be incorporated into the electronic device 110 or operably coupled to the electronic device 110 via wired or wireless interface. For electronic devices with touch sensitive displays, the input components 131 may comprise a touch sensor that operates in conjunction with the display component 130 to permit users to interact with the image displayed by the display component 130 using touch inputs (e.g., with a finger or stylus).

The electronic device 110 may also include at least one communication interface 132 comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol.

The electronic device 110 may also include a processing element 133 for executing instructions and retrieving data stored in a storage element 134 or memory. As would be apparent to one of ordinary skill in the art, the storage element 134 can include one or more different types of memory, data storage or computer-readable storage media, such as, for example, a first data storage for program instructions for execution by the processing element 133, and a second data storage for images or data and/or a removable storage for transferring data to other devices. The storage element 134 may store software for execution by the processing element 133, such as, for example, operating system software and user applications.

The electronic device 110 further includes a first interface 111 and a second interface 112, which provide power interfaces between the device 110 and other components of the system 100, as will be described in greater detail below. The first interface 111 may comprise a dedicated power port whose only function is to deliver power to recharge the device battery pack 122. Alternatively, the first interface 111 may comprise a multi-purpose port which can include a power bus 116 for delivering power to the device battery pack 122 and a data bus for data communications between the device 110 and external devices connected to the first interface 111. USB connectors, micro-USB connectors, and mini-USB connectors are examples of commercially available multi-purpose ports.

An external power supply 140 may be coupled to the first interface 111 to supply power to the device 110 via the power bus 116 in the first interface 111. The power supply 140 may comprise any type of power source, such as, for example, an AC power adapter which converts AC power from a standard household power receptacle into DC power supplied to the device 110. Alternatively, the power supply 140 may comprise a USB cable connected to a powered USB port, such as a port on a personal computer or powered USB hub. The AC power adapter may be configured to receive an input voltage of, e.g., 220-240 VAC, and output a nominal 5 V voltage to the first interface 111.

The second interface 112 is removably couplable to a battery module interface 152 on the battery module 150 to enable both communications and power delivery between the device 110 and the battery module 150. The battery module 150 includes a supplemental battery 162 and a charging/sourcing circuit 160 (referred to herein as charging circuit 160). The charging circuit 160 is configured to operate the battery module 150 in a boost (sourcing) mode, in which power is supplied by supplemental battery 162 to the device 110 for recharging device battery pack 122 or directly powering the device 110, a charge mode, in which the battery module 150 receives power via the battery module interface 152 to recharge the supplemental battery 162 (e.g., an active state charge mode) or the charging circuit 160 is waiting to receive power via the battery module interface 152 (e.g., a stand-by state charge mode). The charging circuit 160 may further operate in a disconnect mode in which the supplemental battery 162 is electrically disconnected from battery module interface 152 to prevent any voltage/current from leaking across the battery module interface 152.

The electronic device 110 and the battery module 150 may be provided in any type of housing suitable for the device 110's intended use. FIGS. 2A-2D illustrate an exemplary electronic device 110 and supplemental battery module 150 in accordance with embodiments of the present invention.

Figure 2A:
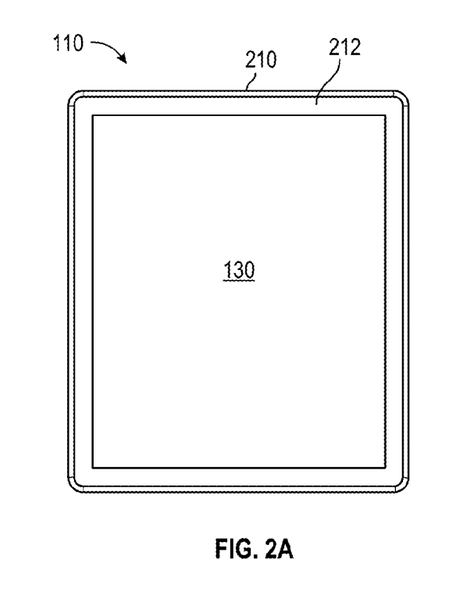
FIG. 2A illustrates a front view of an e-book reader device, in accordance with embodiments of the present invention.
Figure 2B:
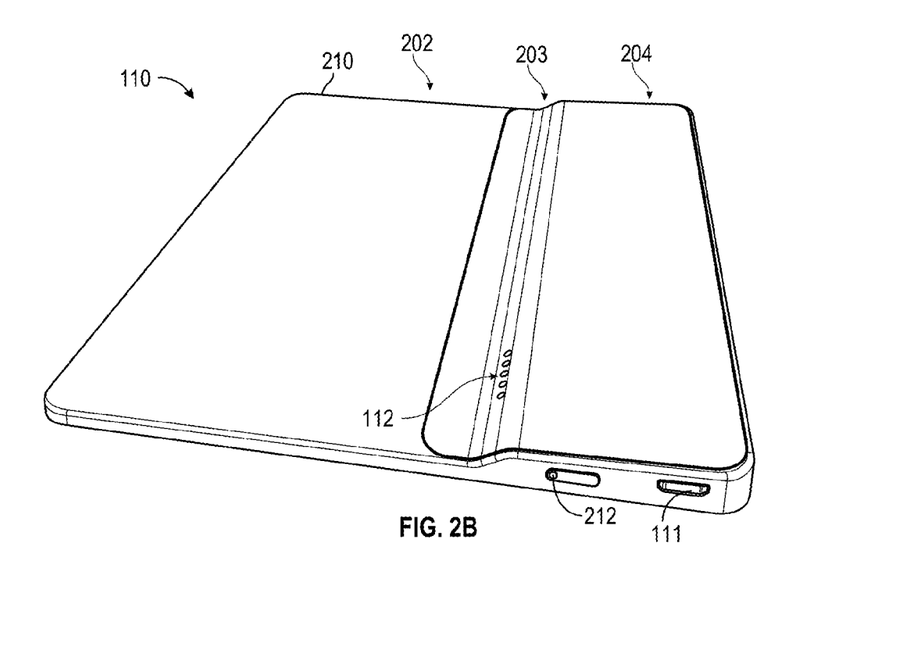
FIG. 2B illustrates a rear perspective view of an e-book reader device, in accordance with embodiments of the present invention.

FIG. 2A illustrates a front view of an e-book reader electronic device 110. FIG. 2B illustrates a rear perspective view of the electronic device 110. The electronic device 110 has a rectangular housing 210 and includes a touch screen display component 130 surrounded by a bezel 212. As can be seen in FIG. 2B, the illustrated embodiment of the electronic device 110 has a non-uniform cross-section with a thin portion 202, a thick portion 204, and a transition portion 203 between the thin portion 202 and the thick portion 204. The thick portion 204 may house certain components of the electronic device 110, such as the processing element 133, storage element 134, power management system 120, and device battery pack 122. In addition, a power switch 212 and the first interface 111 may be provided along an edge of the thick portion 204 of the housing 210. In the illustrated embodiment, the first interface comprises a micro-USB port. Such placement of certain components in the thick portion 204 may be advantageous for comfort of holding the electronic device 110 in one hand, such that the hand may more comfortably grip the thick portion 204. Furthermore, the weight of the thick portion 204 may provide better balance for holding the electronic device 110 with one hand.

Figure 2C:
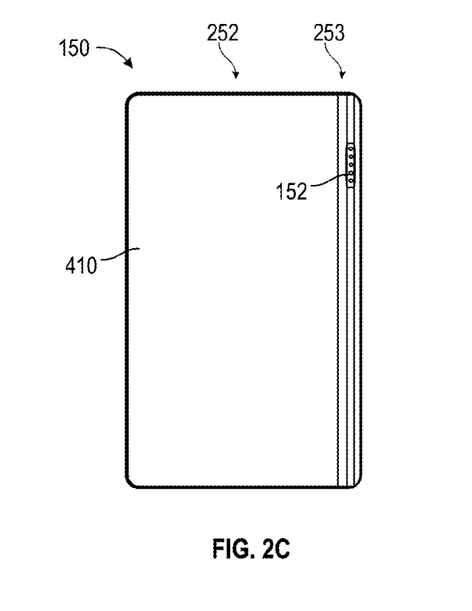
FIG. 2C illustrates a front view of supplemental battery module, in accordance with embodiments of the present invention.
Figure 2D:
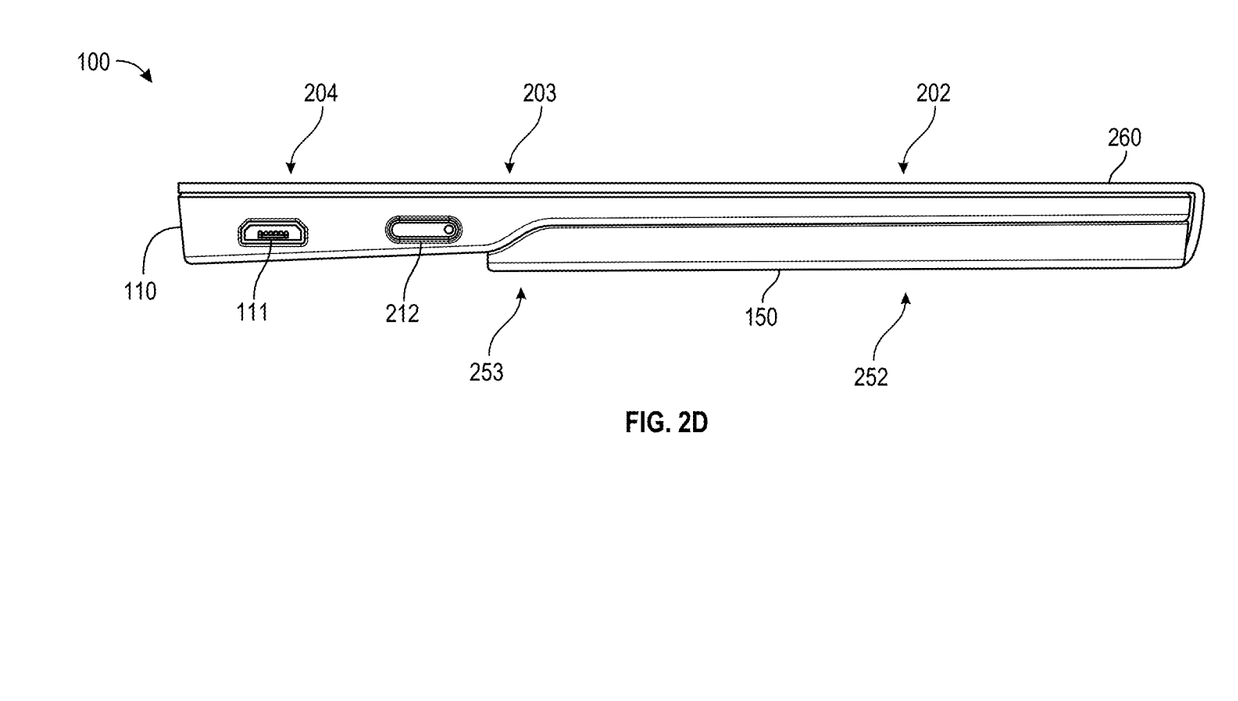
FIG. 2D illustrates a side view of an e-book reader device connected to a supplemental battery module, in accordance with embodiments of the present invention.

FIG. 2C illustrates a front view of a supplemental battery module 150 and FIG. 2D illustrates a side view of the electronic device 110 coupled to the battery module 150. The illustrated battery module 150 has a rectangular housing 410 having approximately the same length as the device 110, but slightly shorter width. When the battery module 150 is coupled with the electronic device 110, a body portion 252 of the battery module 150 is positioned adjacent to the thin portion 202 of the electronic device 110 and sloping portion 253 of the battery module 150 follows the contour of the transition portion 203 of the electronic device 110, thereby providing the system 100 with a roughly uniform cross-sectional thickness. As a result, when the battery module 150 is coupled with the device 110, the system 100 can be easily held by the user to simulate a single device. In the embodiment illustrated in FIG. 2D, the battery module 150 further includes an optional cover portion 260 that extends over the front of the electronic device 110 to cover and protect the display component 130. The cover portion 260 may be folded open like the cover of a book when the user desires to view the display component 130 and closed when the device 110 is not in use.

The electronic device 110 and the battery module 150 may include features to permit the device 110 and module 150 to be retained securely together when coupled, while being easily separable to enable the user to carry just the electronic device 110 when the extended battery life provided by the battery module 150 is not needed. These coupling features may comprise magnets provided on or near the facing surfaces of the device 110 and battery module 150 to provide a magnetic retaining force to securely maintain the coupling of the device 110 and battery module 150. Alternatively or additionally, the coupling features may comprise mechanical latches, clamps, or other mechanical fasteners to provide the desired retaining force between the device 110 and battery module 150.

In the illustrated embodiment, the second interface 112 of the electronic device 110 comprises a plurality of contacts provided on the transition portion 203, and the battery module interface 152 comprises a corresponding plurality of spring loaded pin contacts which form an electrical connection 171 with the contacts of the second interface 112 when the electronic device 110 is connected to the battery module 150. The coupling features may be used to maintain a secure electrical connection between the contacts and corresponding pins until the device 110 is separated from the battery module 150. In other embodiments, other types of interfaces may be used for the second interface 112 and the battery module interface 152, such as, for example, a plug and corresponding receptacle port (e.g., a USB connector).

Figure 3:
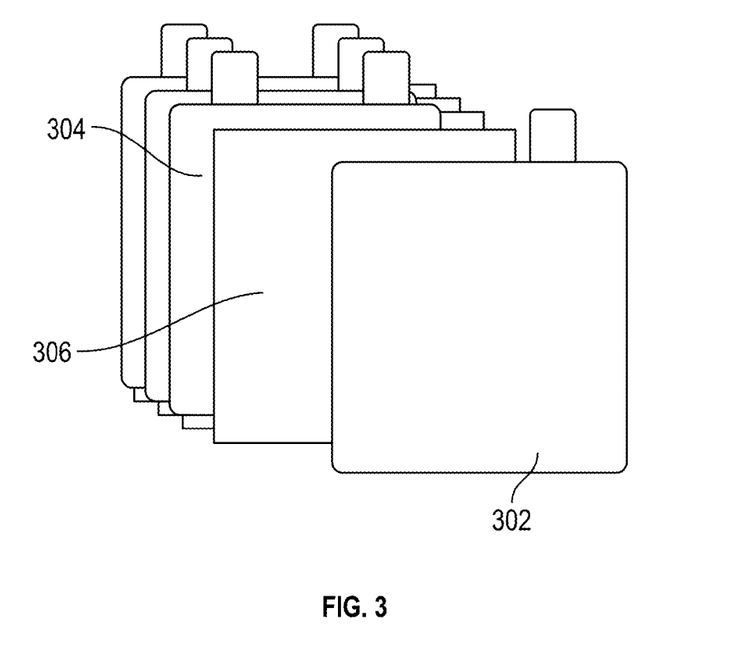
FIG. 3 illustrates a stacked cell structure.
Figure 4:
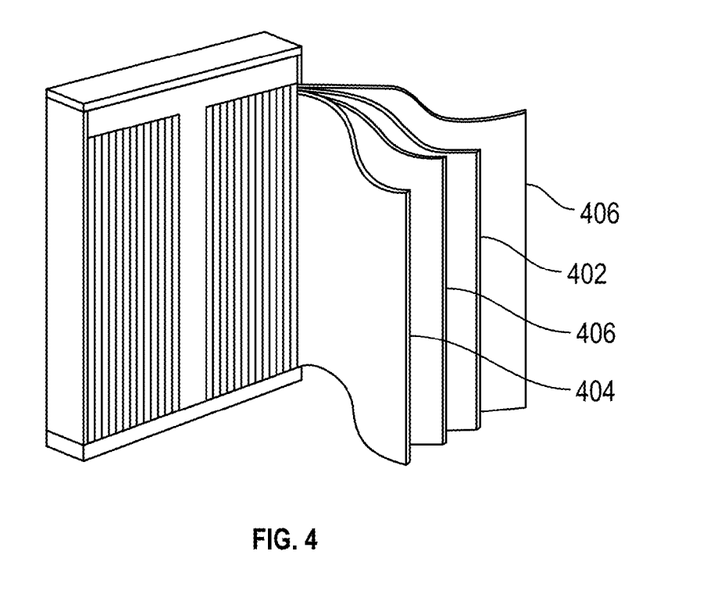
FIG. 4 illustrates a cross-section of wound cell structure, with an unraveled perspective.

Embodiments of the present invention may be implemented using battery cells with desired chemistry and form factor. FIG. 3 is a perspective view illustrating an exemplary stacked cell structure used in pouch cells. FIG. 4 is a perspective view, cross-section including unraveled portion, a illustrating an exemplary wound cell structure used in pouch, prismatic, and cylindrical cells.

As shown in FIG. 3, the stacked electrode structure includes a plurality of anode electrodes 302 stacked alternately with a plurality of cathode electrodes 304, with separators 306 separating the anodes 302 and cathodes 304. As shown in FIG. 4, the wound cell structure includes a continuous anode electrode 402 and a continuous cathode electrode 404 separated by a continuous or segmented separator 406. These components 402, 404, 406 are wound about a mandrel to form a prismatic or cylindrical shape.

The anode electrodes and cathode electrodes in lithium ion cells may be formed in a variety of ways using similar processes. For example, the active electrode materials for the anodes and cathodes are coated on both sides of metallic foils, comprising, e.g., aluminum or copper, which act as the current collectors, when placed in electrolyte (e.g., lithium salt in organic solvent with additives), conducting the current in and out of the cell. The active anode material may comprise a form of carbon and the active cathode material may comprise a mixed metal oxide.

The design of battery cells requires selection of a large number of design parameters. For example, the anode and cathode electrode parameters may include, for example, the percentage of active material in the active material coating, the active material specific capacity, the coating weight, the final coating thickness, and electrode density. In the example described below, the battery cell has an active material specific capacity of approximately 350 mAh/g for the anode and approximately 150 mAh/g for the cathode, a coating weight of approximately 6 mg/cm$^2$ for the anode and approximately 13 mg/cm$^2$ for the cathode, a final coating thickness of approximately 35 μm for the anode and approximately 30 μm for the cathode, and an electrode density of approximately 1.5 g/cm$^3$ for the anode and approximately 4.0 g/cm$^3$ for the cathode. These parameters are merely exemplary and may vary in other embodiments.

The area-specific resistance (ASR) of a battery cell can have a significant impact on battery performance. In particular, when using a battery cell with a small capacity (e.g., less than about 400 mAh), the impact on AC impedance and DC resistance is much larger than in a large capacity battery cell (e.g., greater than about 500 mAh).

DC impedance is the measurement of impedance when a DC load is applied, and AC impedance is the measurement of impedance when an AC load is applied. In accordance with embodiments of the present invention, cells having a low ASR are used in a small capacity battery pack in order to produce improved battery performance. In particular, a low capacity battery cell (e.g., less than or equal to approximately 400 mAh) has an AC impedance ASR of between about 5 Ohm-cm$^2$ and 21 Ohm-cm$^2$ (e.g., approximately 11 Ohm-cm$^2$), and a DC resistance ASR of between about 10 Ohm-cm$^2$ and 41 Ohm-cm$^2$ (e.g., approximately 26 Ohm-cm$^2$). The AC impedance is measured at 1 KHz, 23° C.+/−2° C., 0% to 100% state of charge (SOC). The DC resistance is measured at 0.5 A for a 50 msec pulse at 4.0V OCV (open circuit voltage) or less than 85% state-of-charge, and 23° C.+/−2° C.

In accordance with some embodiments, the total cell AC impedance is less than or equal to about 100 mOhm (max), or, more preferably, less than about 50 mOhm, measured at 1 KHz, 23° C.+/−2° C., 0% to 100% state of charge (SOC), and the total cell DC resistance is less than or equal to about 200 mOhm (max), or, more preferably, less than about 100 mOhm, measured at 0.5 A for a 50 msec pulse at 4.0V OCV (open circuit voltage), and 23° C.+/−2° C.

Power density is defined as power per unit volume or per unit mass. Volumetric energy density is the amount of energy stored per unit volume, often measured in Wh/L. Gravimetric energy density is the battery capacity by weight, often measured in Wh/kg. In accordance with some embodiments, regarding <3 mm thick cells, the volumetric energy density of the cells is greater than or equal to approximately 250 Wh/L, or, more specifically, greater than approximately 350 Wh/L, and the gravimetric energy density of the cells is greater than or equal to approximately 124 Wh/kg, or, more specifically, greater than approximately 190 Wh/kg. Energy density is the amount of energy stored in a given system or region of space per unit volume or mass In accordance with some embodiments, the battery pack is used in an e-book reader device. The e-book reader device may be a standalone reader or may be part of a modular system with a removable battery module, as described above with reference to FIGS. 1 and 2A-2D.

In accordance with some embodiments, the battery pack is used in a small form factor electronic device, such as a smartwatch, a short-range wireless headset, rechargeable battery powered wearable device (e.g., pendant, wristband, glasses), music player, or an Internet of Things device with embedded electronics and a rechargeable battery.

As described above, for many electronic devices, small reductions in size are extremely desirable. Embodiments of the present invention may be particularly useful in electronic devices in which the battery pack occupies a volume of less than or equal to 10 cm$^3$ within the housing of the device, or, more preferably less than or equal to 5 cm$^3$.

In the exemplary embodiment shown in FIG. 1, the battery pack 122 having a total capacity of 250 mAh and external dimensions of, for example, 2.42 mm thickness (with 2.55 mm maximum after swelling), 33.43 mm width, and 40.55 mm length, with each battery cell having external dimensions of, for example, 2.32 mm thickness, 33.33 mm width, and 37.15 mm length. In other embodiments, the external dimensions may vary from this example, e.g., by +/−50% or +/−25%. The cell volumetric energy density is approximately 322 Wh/L, the gravimetric energy density is approximately 168 Wh/kg, the total cell electrode surface is approximately 155 cm$^2$, with a cell AC impedance of approximately 70 mOhm (max) and cell AC impedance ASR of approximately 11 Ohm-cm$^2$, both measured at 1 KHz, 23° C.+/−2° C., 0% to 100% state of charge (SOC), and a cell DC resistance of approximately 170 mOhm (max) and cell DC resistance ASR of approximately 26 Ohm-cm$^2$, both measured at 0.5 A for a 50 msec pulse at 4.0V OCV (open circuit voltage), and 23° C.+/−2° C. The cell electrolyte has a conductivity of greater than 6×10$^{-3}$ S/cm. The cell separator has a thickness of less than 12 μm. The battery pack pouch material has a thickness of less than 100 μm. It is to be understood that this is merely an exemplary embodiment, and other embodiments may have different characteristics.

Figure 5:
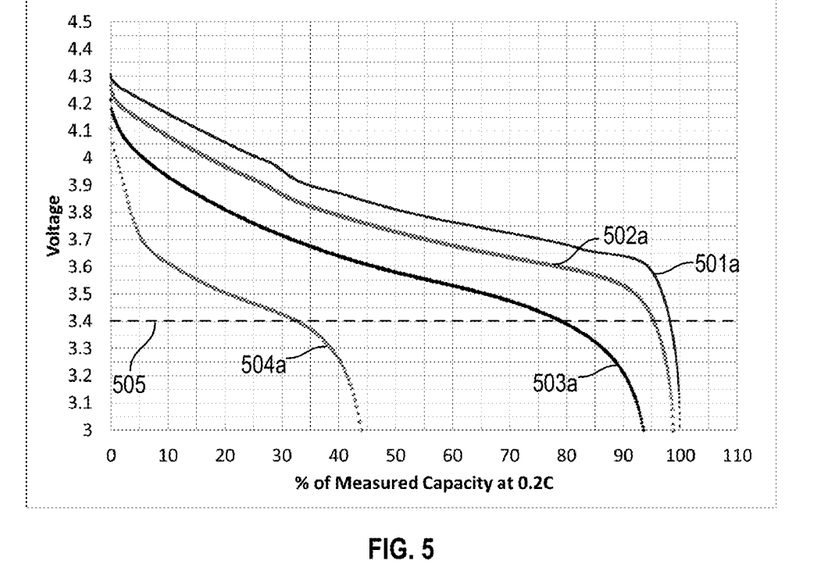
FIGS. 5-6 are graphs illustrating the discharge curves of battery packs taken at different discharge rates.
Figure 6:
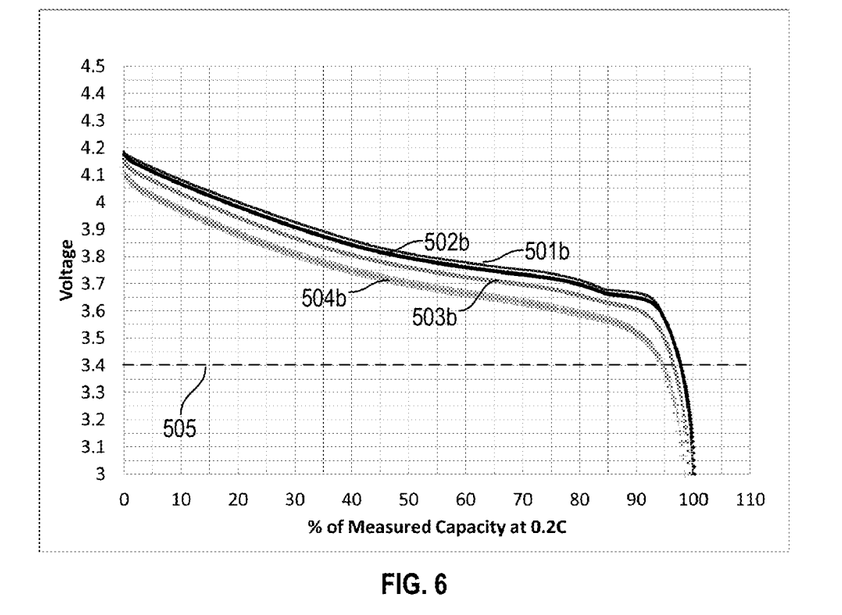

FIGS. 5-6 are graphs illustrating the discharge curves of battery packs taken at different C-ratings. FIG. 5 shows the discharge curves 504a-501a of a conventional battery pack having a capacity of 300 mAh. FIG. 6 shows the discharge curves 501b-504b of the 250 mAh battery pack 122 described above. The x-axis represents the percentage of measured capacity at 0.2C from the expected capacity at the various cut-off voltages on the y-axis, based on rated expected capacity provided by the cell manufacturer. C-ratings are used to scale the charge and discharge currents for a battery. Each discharge curve represents the measured capacities for a different discharge rate, with curve 504a representing a 2.0C discharge rate, curve 503a representing a 1.0C discharge rate, curve 502a representing a 0.5C discharge rate, and curve 501a representing a 0.2C discharge rate. The voltage may be measured by the protection circuit module 125. During normal use, the processing element 133 may be programmed to cause the device 110 to begin a graceful shutdown process when the protection circuit module 125 detects that the cut-off voltage has been reached.

As shown by discharge curve 501a, when discharging the conventional battery at a low 0.2C discharge rate, the battery is able to achieve approximately 100% of the expected capacity at a cut-off voltage of 3.0V. However, as described above, many modern devices require much higher cut-off voltages and are configured to issue a low battery warning or shut down when the battery reaches cut-off voltages of up to, e.g., 3.4V or 3.5V. In FIGS. 5-6, the electronic device with which the battery is expected to be used has a cut-off voltage of 3.4V, shown by line 505. At a 0.2C discharge rate, curve 501a reaches the 3.4V cut-off voltage at approximately 98% of the expected capacity. In a conventional battery at low discharge rates, the measured capacity is typically very close to the expected capacity, which is confirmed by curve 501a. At a 0.5C discharge rate, discharge curve 502a reaches the 3.4V cut-off voltage at approximately 95% of the expected capacity, which is only a slight performance drop from curve 501a. However, at higher discharge rates, the performance is considerably worse. For example, at a 1.0C discharge rate, curve 503a reaches the 3.4V cut-off voltage at approximately 78% of the measured capacity, and at a 2.0C discharge rate, curve 504a reaches the 3.4V cut-off voltage at approximately 32.5% of the measured capacity. As a result, when using a conventional small capacity battery in an electronic device which experiences periodic spikes in current draw, the user will only be able to achieve 32.5% of the expected battery life before the device shuts down due to a low battery condition. This level of battery performance can dramatically reduce the quality of a user's experience with that device.

As shown in FIG. 6, a small capacity battery pack 122 having a low area-specific resistance is able to achieve improved battery life performance, even at high discharge rates. Discharge curves 501b-504b represent the battery performance at the same levels as those tested in FIG. 5: 0.2C, 0.5C, 1.0C, and 2.0C, respectively. As can be seen in FIG. 6, the discharge curves 501b-504b are very closely grouped, indicating that the battery performance at those different discharge rates is very similar. This is in contrast with the wide spread of curves 501a-504a in FIG. 5. At 0.2C, discharge curve 501b crosses the 3.4V cut-off voltage at approximately 98% of the expected capacity. At 1.0C, discharge curve 503b crosses the 3.4V cut-off voltage at approximately 97% of the expected capacity. At 2.0C, discharge curve 504b crosses the 3.4V cut-off voltage at approximately 95% of the expected capacity. As a result, a user of a device with battery pack 122 will be provided with much improved battery life, and therefore an enhanced user experience. In other embodiments, the measured capacity of the cell at a C-rating of 2.0C and a voltage of 3.4V is decreased from a manufacturer-rated expected capacity of the cell by less than 20%, less than 10%, or less than 5%, and the measured capacity of the cell at a C-rating of 1.0C and a voltage of 3.4V is decreased from a manufacturer-rated expected capacity of the cell by less than 15%, less than 10%, or less than 5%.

Figure 7:
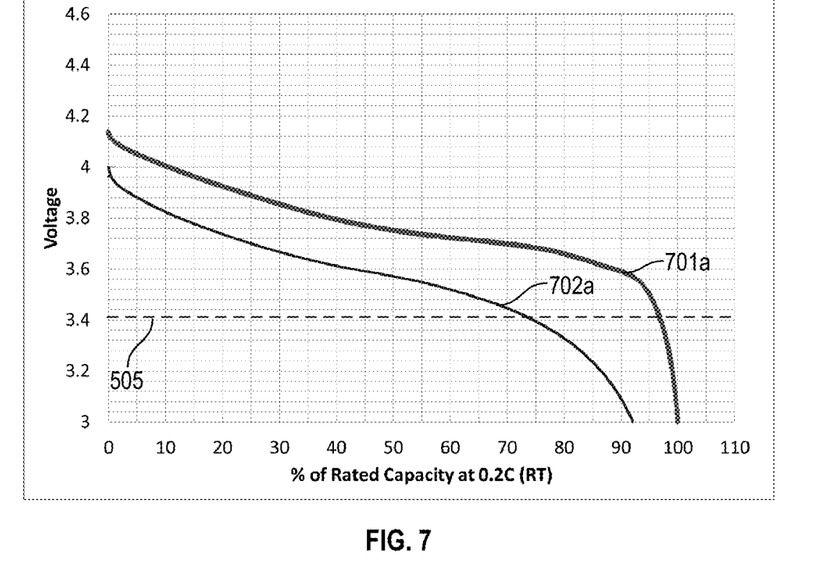
FIGS. 7-8 are graphs illustrating the discharge curves of battery packs taken at different temperatures.
Figure 8:
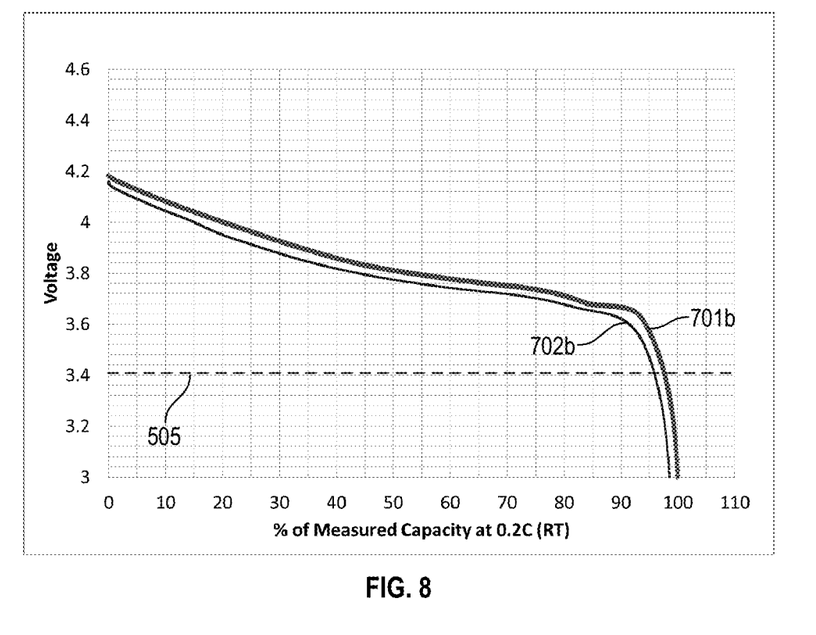

FIGS. 7-8 are graphs illustrating the discharge curves of battery packs taken at a fixed 0.2C discharge rate, but at different temperatures. FIG. 7 shows the discharge curves 701a-702a measured room temperature (approximately 23° C.+/−2° C.) and 0° C., respectively, and FIG. 8 shows the discharge curves 701b-702b at those same temperatures. As can be seen in FIG. 7, the measured capacity at 0° C. is approximately 88% of the expected capacity. Accordingly, operating the device at colder temperatures noticeably degrades the battery performance. In contrast, FIG. 8 shows that the low area-specific resistance of battery pack 122 results in very similar measured capacities, regardless of the operating temperature.

Embodiments of the present invention may provide various advantages not provided by prior art systems. Devices with low capacity batteries having low area-specific resistance may provide improvements in battery life over conventional batteries, particularly under variable current draw conditions. However, using batteries with low area-specific resistances may also present a number of disadvantages, which is why conventional batteries typically do not utilize such designs. For example, lowering the ASR of a battery often results in a decrease in energy density, which results in a decreased battery capacity for a battery having the same volume. However, the performance impact of this reduction in energy density is more than offset by the battery capacity improvements at higher discharge rates and lower temperatures.

In addition, reducing the thickness of the active material coating on the electrodes and thinner separators, in order to achieve a lower ASR, can disadvantageously result in a higher self-discharge rate for the battery cell. As a result, low ASR cells may provide decreased storage and standby life. However, the impact of using a battery with a higher self-discharge rate is mitigated by the user's ability to simply recharge the battery after storing the device for extended periods of time.

Embodiments of the present invention are particularly beneficial when used in electronic devices with space for only a small battery, but with relatively high current demands, such as an e-book reader. In devices While the invention has been described in terms of particular embodiments and illustrative figures, those of ordinary skill in the art will recognize that the invention is not limited to the embodiments or figures described. Many of the embodiments described above are directed to an e-book reader electronic device, and, in particular, an e-book reader with a removable supplemental battery module. These embodiments can be particularly advantageous for e-book readers because users of e-book readers have very high expectations regarding light device weight (e.g., less than 8 oz.) and extended battery capacity (e.g., several weeks or months of battery life between recharges). However, any type of battery-powered electronic device may be used in other embodiments, such as mobile phones, tablet computers, smart watches, and the like.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the processes, flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A system, comprising:
 a rechargeable battery cell comprising:
  an anode electrode;
  a cathode electrode; and
  a separator positioned between the anode electrode and the cathode electrode;
  wherein the rechargeable battery cell has a capacity of less than about 400 mAh and a DC resistance area-specific resistance (ASR) of less than or equal to about 55 Ohm-cm$^2$ measured at 0.5A, 23° C. +/−2° C. for a 50 msec pulse at 4.0V open circuit voltage or less than 85% state-of-charge.

2. The system of claim 1, further comprising:
 a display; and
 a processing component.

3. The system of claim 2, wherein the rechargeable battery cell has an AC impedance area-specific resistance (ASR) of less than or equal to about 25 Ohm-cm2 measured at 1 KHz, 23° C. +/−2° C., 0% to 100% state of charge.

4. The system of claim 2, wherein the rechargeable battery cell has a thickness less than 3 mm.

5. The system of claim 2, further comprising:
a computer-readable memory storing computer-executable instructions which when executed cause the processing component to shut down when the rechargeable battery cell reaches a cut-off voltage of greater than approximately 3.6V.

6. The system of claim 2, further comprising:
a housing containing the rechargeable battery cell; and
a supplemental battery module removably coupled to the housing and configured to recharge the rechargeable battery cell, the supplemental battery module having a capacity of greater than 1,000 mAh.

7. The system of claim 2, wherein a measured capacity of the rechargeable battery cell at a C-rating of 2.0C and a voltage of 3.4V is decreased from a manufacturer-rated expected capacity of the rechargeable battery cell by less than 20%.

8. The system of claim 2, wherein a measured capacity of the rechargeable battery cell at a C-rating of 1.0C and a voltage of 3.4V is decreased from a manufacturer-rated expected capacity of the rechargeable battery cell by less than 5%.

9. The system of claim 2, wherein the rechargeable battery cell has a volume of less than approximately 5 cm$^3$.

10. The system of claim 2, further comprising a protection circuit effective to detect when the rechargeable battery cell reaches a cut-off voltage.

11. The system of claim 1, wherein the rechargeable battery cell has an AC impedance area-specific resistance (ASR) of less than or equal to about 25 Ohm-cm2 measured at 1 KHz, 23° C. +/−2° C., 0% to 100% state of charge.

12. The system of claim 1, further comprising:
a housing containing the rechargeable battery cell; and
a supplemental battery module removably coupled to the housing and configured to recharge the rechargeable battery cell, the supplemental battery module having a capacity of greater than 1,000 mAh.

13. The system of claim 1, wherein a measured capacity of the rechargeable battery cell at a C-rating of 2.0C and a voltage of 3.4V is decreased from a manufacturer-rated expected capacity by less than 20%.

14. The system of claim 1, wherein a measured capacity of the rechargeable battery cell at a C-rating of 1.0C and a voltage of 3.4V is decreased from a manufacturer-rated expected capacity by less than 5%.

15. The system of claim 1, wherein the rechargeable battery cell comprises a lithium ion cell.

16. The system of claim 1, wherein the rechargeable battery cell has a volume of less than approximately 5 cm$^3$.

17. The system of claim 1, wherein the rechargeable battery cell has:
a volumetric energy density of greater than 300 Wh/L; and
a gravimetric energy density of greater than 160 Wh/kg.

18. The system of claim 1, wherein the rechargeable battery cell has:
a cell AC impedance of less than or equal to 0.070 Ohm; and
a cell DC resistance of less than or equal to 0.170 Ohm.

19. The system of claim 1, wherein the capacity of the rechargeable battery cell is less than about 300 mAh.

20. The system of claim 1, wherein the rechargeable battery cell has the capacity of less than about 400 mAh and the DC resistance area-specific resistance (ASR) of less than or equal to about 55 Ohm-cm$^2$ such that a first measured capacity of the rechargeable battery cell corresponds to within 20% of a first expected capacity of the rechargeable battery cell at a first discharge rate and a second measured capacity of the rechargeable battery cell corresponds to within 20% of a second expected capacity of the rechargeable battery cell at a second discharge rate different from the first discharge rate.

* * * * *